United States Patent [19]

Dugan

[11] Patent Number: 4,721,200

[45] **Date of Patent: * Jan. 26, 1988**

[54] CAN FILLING SYSTEM TO PREVENT DAMAGE TO CANS

[75] Inventor: Larry M. Dugan, Boulder, Colo.

[73] Assignee: Adolph Coors Company, Golden, Colo.

[ * ] Notice: The portion of the term of this patent subsequent to May 12, 2004 has been disclaimed.

[21] Appl. No.: 16,930

[22] Filed: Feb. 20, 1987

Related U.S. Application Data

[63] Continuation of Ser. No. 821,151, Jan. 21, 1986, Pat. No. 4,664,159, which is a continuation of Ser. No. 652,728, Sep. 21, 1984, abandoned.

[51] Int. Cl.[4] .............................................. B65G 47/84

[52] U.S. Cl. .................................. 198/480.1; 141/145

[58] Field of Search ........................... 141/1, 140, 145; 198/480.1, 481.1, 608, 688.1, 803.8

[56] References Cited

U.S. PATENT DOCUMENTS

| | | | |
|---|---|---|---|
| 1,258,623 | 3/1918 | Stake et al. | 198/481 X |
| 2,630,203 | 3/1953 | Lippold | 198/480.1 |
| 2,801,650 | 8/1957 | Breeback | 141/1 |
| 3,263,713 | 8/1966 | Tarcza | 141/165 |
| 4,664,159 | 5/1987 | Dugan | 141/1 |

FOREIGN PATENT DOCUMENTS

| | | | |
|---|---|---|---|
| 602715 | 3/1960 | Italy | 141/145 |

*Primary Examiner*—Mark J. Thronson

*Attorney, Agent, or Firm*—Klaas & Law

[57] ABSTRACT

A can filling device for minimizing damage to cans during filling by providing full can pockets on a filler wheel having upper and lower arm portions which maintain the constant vertical orientation of the can during the filling process. A locator brush is disposed to induce an inward radial force relative to the rotating filler wheel to maintain the can within the can pocket. Additionally, a hold down guide assembly displaces the cans in a downward position on the rotating filler wheel to prevent damage by the spindle mechanism. Sufficient tangential clearance is provided by the star wheel pockets to prevent damage due to play between the rotating filler wheel and the star wheel. Close tolerances are provided in the radial direction to ensure full transfer of the can from the star wheel pocket to the filler wheel pocket.

8 Claims, 7 Drawing Figures

CAN FILLING SYSTEM TO PREVENT DAMAGE TO CANS

This application is a continuation, of application Ser. No. 821,151, filed Jan. 21, 1986, now U.S. Pat. No. 4,664,159, which in turn is a continuation of application Ser No. 652,728, filed Sept. 21, 1984, now abandoned.

BACKGROUND OF THE INVENTION

The present invention pertains generally to can filling systems and more particularly to can filling systems which prevent damage to cans.

Beverage containers, such as beverage cans, are filled with beverages such as beer, soft drinks, etc., in a can filling machine just prior to application of the top of the can in a seamer machine. In order to increase productivity and speed of production, can filling machines have been designed to operate at high speeds. Typical high speed can filling machines are capable of filling cans at a rate of 1,800 cans per minute. At such high rates of filling, occasional damage occurs to the cans which causes the cans to leak. Leaking cans are normally readily identifiable by quality control personnel. However, occasionally a slow leaking can will be produced because of improper seaming as a result of slight indentations or deformations of the flange portion of the can.

Correction of the problems caused by slow leaking cans can be quite expensive. Typically, slow leaking cans are not discovered until they are packaged in a multiple packaging container and sometimes not until they are palletized for shipment. If leaks occur after the cans have been packaged and palletized, the leaking can must be located and replaced and the packaging material must be either cleaned or replaced.

A typical can filling machine for use with the present invention comprises the can filler CF 120 produced by H & K, Inc., 2365 South 170th Street, New Berlin, Wis. 53151.

Operation of conventional high speed can filling machines has typically resulted in approximately in 70 leaking cans for every 100,000 cans processed. By reducing this amount to 3 leaking cans in every 100,000 cans processed, a considerable amount of money can be saved by can processing plants.

SUMMARY OF THE INVENTION

The present invention overcomes the disadvantages and limitations of the prior art by providing a can filling device and method which minimizes damage to cans during filling. The present invention may therefore comprise a can filling device for minimizing damage to cans during filling comprising a rotating filler wheel for transporting the cans in a substantially circular path; a filler wheel pocket for maintaining the cans in a substantially vertical orientation during movement in the substantially circular path around the rotating filler wheel by engaging said cans at upper and lower portions of the cans with upper and lower pocket portions of the filler wheel pocket; a star wheel for transporting the cans to a rotating filler wheel; a star wheel pocket for transferring the cans to the upper and lower pocket portions of the filler wheel pocket with sufficient clearance in a tangential direction relative to the substantially circular path to prevent damage to the cans; a locator brush for locating the cans in a filler wheel pocket by engaging the cans at a location between the upper and lower pocket portions to force the cans in a radially inward direction relative to the substantially circular path against both the upper and lower pocket portions of the filler wheel pocket.

The present invention may also comprise a can filling device for minimizing damage to beverage cans during filling comprising a rotating filler wheel for transporting the cans in a substantially circular path in a substantially horizontal plane with the axis of the cans substantially parallel to a substantially vertical axis, a filler wheel pocket disposed on a rotating filler wheel and having upper and lower arm portions with substantially semicircularly shaped can pockets formed therein for holding the cans at upper and lower portions of the cans which are spatially separated along the axis of the cans to prevent radially inward and tangential displacement of the axis of the cans from the substantially vertical axis, a star wheel for transferring cans from a can supply to a filler wheel pocket, a star wheel pocket disposed in a star wheel having a nonsymmetrical curved surface for transferring the cans to a filler wheel pocket with sufficient clearance to prevent damage to the cans, a locator brush for locating the cans in a filler wheel pocket by inducing a radially inward force on the cans at a location between the upper and lower portions of the cans to induce movement of the cans in a radially inward direction against the filler wheel pocket, a hold down guide for holding the cans in a downward direction against the substantially horizontal plane to prevent damage to the cans during filling.

The present invention may also comprise a method of maintaining a substantially constant vertical orientation of beverage cans during filling comprising the steps of providing a source of beverage cans, sequentially transporting the cans on a star wheel from the source of beverage cans to a rotating filler wheel, transferring the cans from the star wheel to the filler wheel, providing filler wheel can pockets in the filler wheel for supporting the cans on both upper and lower portions of the cans with a semicircularly shaped can pocket capable of maintaining a substantially vertical orientation of the cans in both a tangential and inward radial direction of the filling wheel, providing star wheel can pockets in the star wheel having sufficient clearance in the tangential direction of the star wheel to transfer the cans from the star wheel can pockets to the filler wheel can pockets without causing damage to the cans, inducing a force on the cans in an inward radial direction of the filler wheel with a locator brush after the cans have been transferred from the star wheel can pockets to the filler wheel can pockets to locate the cans in the filler wheel can pockets.

The present invention is therefore capable of substantially minimizing damage to cans during the filling process to greatly reduce the number of leaking cans which can cause substantial expense to a canning operator. By incorporating the modifications to maintain a constant vertical orientation of the cans during the filling process, the production speed of the can filling machine can be increased substantially to further increase productivity while maintaining a very small damage rate.

OBJECTS OF THE INVENTION

It is therefore an object of the invention to provide an improved can filling device and method.

It is also an object of the present invention to provide a can filling device for minimizing damage to cans during the filling process.

Another object of the present invention is to provide a can filling device for minimizing damage to beverage cans during filling.

Another object of the present invention is to provide a method of maintaining a substantially constant vertical orientation of beverage cans during the filling process.

Additional objects, advantages and novel features of the invention are set forth in part in the description which follows and will be understood by those skilled in the art upon examination of the following or may be learned by practice of the invention. The objects and advantages of the invention may be realized and obtained by means of the instrumentalities and combinations particularly pointed out in the appended claims.

BRIEF DESCRIPTION OF THE DRAWINGS

An illustrative and presently preferred embodiment of the invention is shown in the accompanying drawings, wherein.

DETAILED DESCRIPTION OF THE INVENTION

Figure 1:
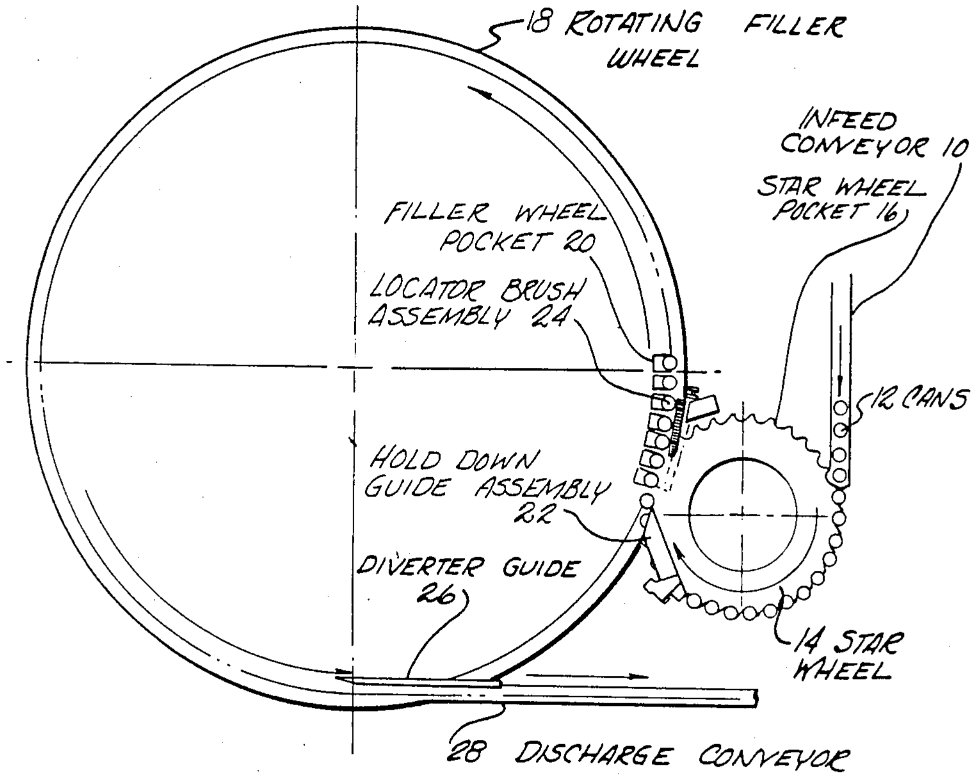
FIG. 1 is a plan view schematically illustrating the present invention.

FIG. 1 is a schematic plan view of the device of the present invention. Infeed conveyor 10 transports a plurality of cans 12, such as beverage containers, from a source of cans in a sequential manner to a star wheel 14. Star wheel pockets 16 engage cans 12 from infeed conveyor 10 and transport the cans in a semi-circular path to rotating filler wheel means 18. Star wheel 14 transfers cans 12 to filler wheel pockets 20 at the point at which the tangents of star wheel 14 and rotating filler wheel 18 meet. Hold down guide assembly 22 comprises a slanted plate member which progressively forces cans 12 in star wheel means 14 in a downward direction as they are transferred to filler wheel pockets 20. Hold down guide assembly 22 ensures that the cans are in a fully downwardly displaced position during the filling process. Locator brush assembly 24 induces a force in an inward radial direction relative to rotating filler wheel means 18 to force cans 12 into the filler wheel pocket 20. A filling tulip is cammed down onto the top of cans 12 while locator assembly brush 24 maintains cans 12 in filler wheel pockets 20 to ensure that the cans 12 are maintained in a constant vertical orientation. During and subsequent to the filling process, cans 12 are transported around rotating filler wheel 18 until they are diverted by diverter guide 26 onto discharge conveyor 28 which leads to a can seamer.

Figure 2:
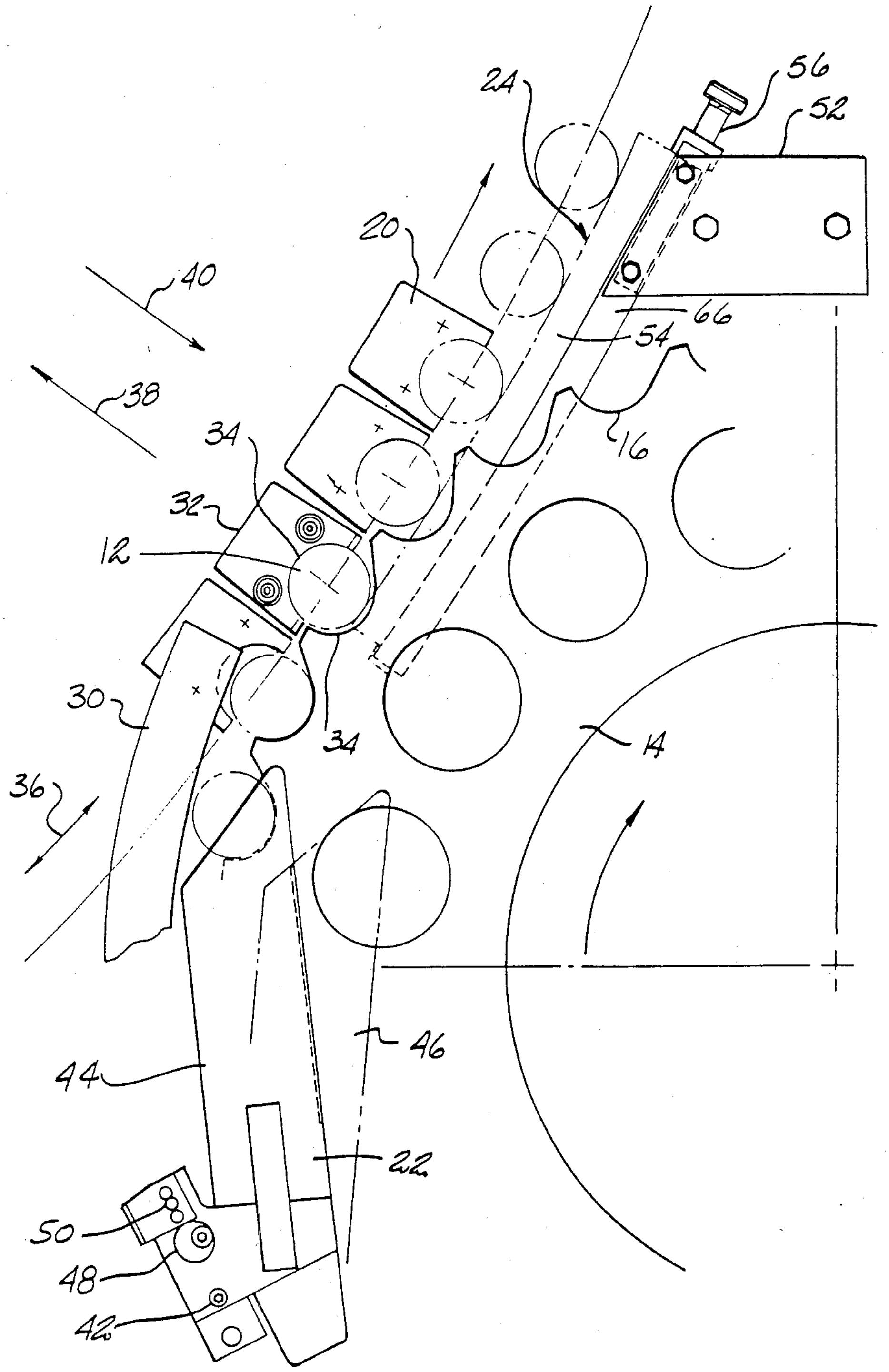
FIG. 2 is a detailed schematic plan view of a portion of FIG. 1 illustrating the primary components of the present invention.

FIG. 2 comprises a detailed schematic plan view of the device illustrated in FIG. 1. As illustrated in FIG. 2 the cans 12 enter from the bottom portion of the figure and travel beneath hold down guide assembly 22. Guide rail 30 maintains the position of cans 12 within star wheel 14 with a predetermined tolerance to prevent damage to the cans. Hold down guide assembly 22 is disposed in a position to maintain cans 12 in a downwardly displaced position against a can platform.

The tangent point of star wheel 14 and the tangent point of rotating filler wheel 18 meet at the point at which filler wheel pocket 32 is adjacent star wheel pocket 34. Star wheel pocket 34 transfers can 12 into filler wheel pocket 32 at the tangent point. Locator brush 24 engages can 12 upon transfer from star wheel pocket 34 to filler wheel pocket 32 to locate can 12 in filler wheel pocket 32. Locator brush 24 maintains engagement with can 12 as filler wheel pocket 32 moves around rotating filler wheel 18 in a counter-clockwise direction, as illustrated in FIG. 2. Locator brush 24 is capable of maintaining a constant pressure on cans 12 to ensure that cans 12 are fully seated within filler wheel pocket means 20 while the filling tulip is being cammed down over the cans 12. Filler wheel pocket means 20 comprise full control can pockets having a semicircular shape. Filler wheel pockets 20 are machined with a very close tolerance such that cans 12 fit within the pocket portions 34 of filler wheel pocket means 20 in an extremely closely fitting manner with very little clearance. This prevents movement of can 12, when fully disposed in pocket portion 34 of filler wheel pocket means 20, in the tangential direction relative to rotating filler wheel means 18, as indicated by arrow 36, and movement in an inward radial direction relative to rotating filler wheel 18, as indicated by arrow 38. Locator brush assembly 24 induces a force in an inward radial direction, relative to rotating filler wheel 18, as indicated by arrow 38, to prevent movement in an outward radial direction, as indicated by arrow 40. Consequently, can 12 is maintained in a constant vertical orientation in filler wheel pocket means 20 after transfer from star wheel pocket 16 and engagement by the locator brush assembly 24. Locator brush assembly 24 comprises a bracket 52 which is connected to the can filling machine for supporting the locator brush assembly. Locator brush 54 is attached to connecting plate 52 by way of screw connector 56 and brush support 66.

Hold down assembly 22 is pivotally mounted on bolt 42 to allow movement from an operating position 44 to a displaced position 46 to prevent interference of hold down guide assembly 22 during cleaning of the can filling machine. A CP cap is applied to a tulip filling mechanism so that caustic material can be recirculated through the system for periodic cleaning. Movement of the hold down guide assembly 22 to the displaced position 46 prevents interference with the CP caps. Oversize hole 48 allows movement to the displaced position 46 about pivoting point 42. A series of spring plungers 50 maintain the hold down guide assembly 22 in proper location for engaging cans 12.

Rotating filler wheel 18 has a very large diameter so that a large number cans can be filled in a short time period. Typical diameters for rotating filler wheel 18 are on the order of 16 feet. Similarly, star wheel 14 typically has a diameter of 3 feet. As a result of the large diameters of these devices, a certain amount of play exists between the rotating filler wheel 18 and star wheel 14. This causes backlash and mismatching of the filler wheel pockets 20 and star wheel pockets 16. Since filler wheel pockets 20 have a full pocket designs to provide a high degree of control of cans 12, a certain amount of clearance is required in star wheel pocket 16 to prevent damage to the can as a result of any mismatch during transfer of cans 12 from star wheel means 14 to rotating filler wheel means 18. Consequently, a predetermined amount of tangential clearance relative to rotating filler wheel means 18 and star wheel means 14 as indicated by arrow 36, is required to prevent damage to cans 12. This predetermined amount of clearance is provided by star wheel pocket means 16 which have a nonsymmetrical shape forming a partial pocket portion having a plurality of interlocking radii of curvature with a continuously curved surface. The continuously curved surface is coupled to a flat cutaway portion allowing for a certain amount of roll-off of cans 12 in the tangential direction of star wheel 14.

Figure 3:
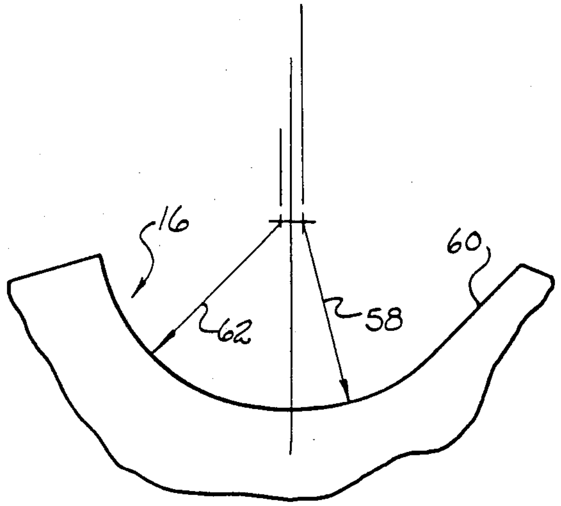
FIG. 3 is a schematic plan view illustrating the pocket profile of the star wheel of the present invention.

FIG. 3 illustrates the pocket profile of star wheel pockets 16. As illustrated in FIG. 3 the star wheel pocket 16 is formed from two tangentially displaced radii which provide can clearance in the tangential direction. Radius 58 joins with a flat portion 60 to provide additional tangential clearance on the leading portion of filler wheel pocket 20. The tangential displacement of the center points of radii 58, 62 provide the tolerance required to prevent damage to cans 12 as a result of play between the rotary filler wheel 18 and star wheel 14. Radii 58, 62 are typically only very slightly larger than the radius of the cans so that proper transfer of cans 12 from star wheel pockets 16 to filler wheel pockets 20 is ensured by the small clearances which are provided by this design in the radial direction. Of course, small clearances in the radial direction do not increase the risk of can damage since mismatch between star wheel means 14 and rotating filler wheel means 18 results from play in the tangential direction. Consequently, the pocket profile of star wheel pocket 16, as illustrated in FIG. 3, results in complete transfer of the can to filler wheel pocket 20 with very small clearance in the radial direction and fairly large clearance in the tangential direction so as to prevent can damage.

Figure 4:
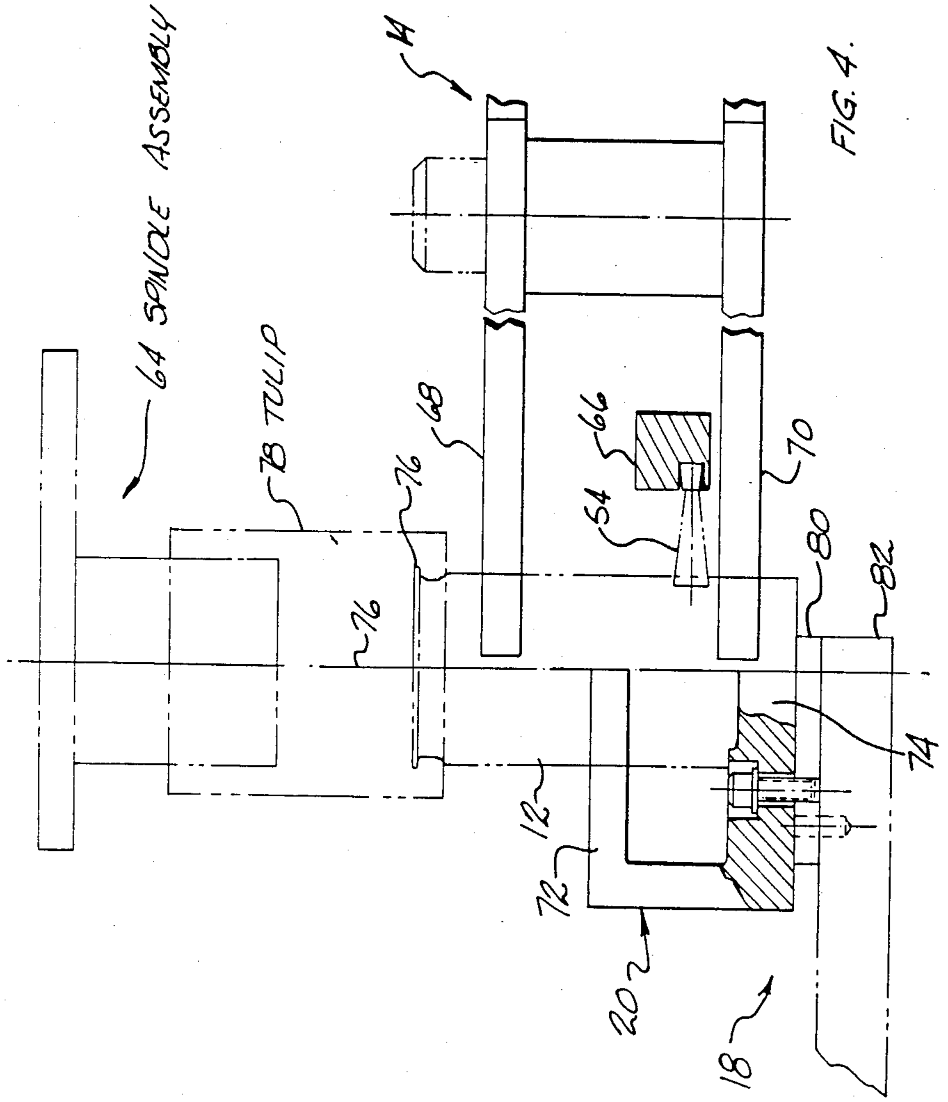
FIG. 4 is schematic elevation view illustrating the primary components of the present invention.

FIG. 4 is a schematic elevation view illustrating the transfer of the can 12 from star wheel means 14 to rotating filler wheel means 18. Star wheel means 14 has upper and lower arm portions 68, 70 with a star wheel pocket 16 formed therein which engages can 12 to transfer can 12 to filler wheel pocket means 20. Filler wheel pocket means 20 has upper and lower arm portions 72, 74 which have filler wheel pocket portions 34 formed therein to engage can 12 at upper and lower portions of can 12 to maintain the axis 76 of can 12 in a constant substantially vertical orientation. Support of can 12 on only lower portions, such as that provided by lower arm portion 74, as is prevalent in prior art devices, does not provide sufficient support to maintain a constant vertical orientation of can 12 during the high speed operation of transferring cans from star wheel means 14 to rotating filler wheel means 18 and locating cans 12 in filler wheel pocket means 20. The additional support provided by upper arm portion 72 which engages upper portions of can 12 functions to provide sufficient support to maintain a constant vertical orientation of the axis 76 of can 12.

Locator brush 54 is disposed in brush holder 66 to exert an inward radial force relative to rotating filler wheel means 18 on can 12 at a location between the points at which upper and lower arm portions 72, 74 engage can 12. The force induced by brush 54 against can 12 fully locates can 12 within filler wheel pocket means 20. A positive inward radial force can be generated by brush 54 without damage to the cans and thereby ensures full seating of the can 12 in the filler wheel pocket means 20 while the filling tulip is being lowered and seated on the can to clamp and seal the cam for filling. This is vitally important to prevent damage to flange portions 76 of can 12 by the tulip 78. As soon as the can 12 is positioned in the filler wheel pocket 20, tulip 78 is cammed in a downward direction along axis 76 over the top of can 12 so that fluid may be placed in can 12. Tulip 78 functions to seal the top can 12 to allow passage of fluid through spiral assembly 64 into can 12. Filler wheel plate 82 provides a support for can platform 80 and filler wheel pocket means 20. If can 12 is not maintained in a constant vertical orientation in alignment with tulip 78, and seated upon platform 80 in a fully downward position, tulip 78 can cause damage to flange portion 76 and cause leaking of the can after the seaming process.

Figure 5:
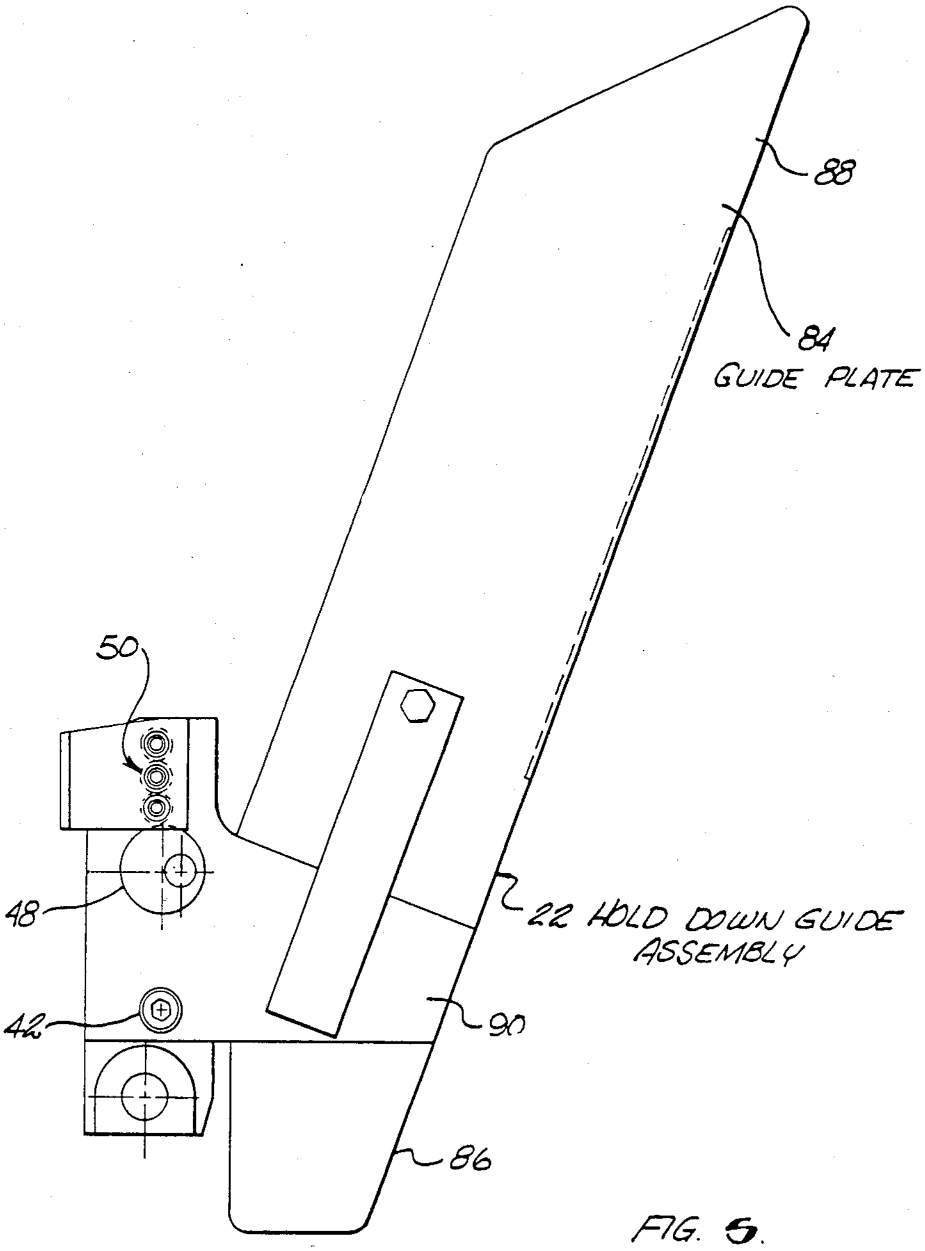
FIG. 5 is a schematic plan view of the hold down guide assembly.

FIG. 5 is a detailed diagram of hold down guide assembly 22. Hold down guide assembly 22 has a guide plate 84 which is disposed in a slanted orientation to induce a downward force on cans 84 during the process of transfer to rotating filler wheel means 18. Guide plate 84 is slanted in a downward direction from front portion 86 to rear portion 88. Guide plate 84 is supported by bracket 90 which is pivotally mounted on the can filling device by way of bolt 42. The oversized opening 48 allows pivoting motion around pivot point 42. Spring plungers 50 orient the hold down guide assembly 22 in a predetermined position 44, as illustrated in FIG. 2. Upon application of CP caps, cleaning of the can filling machine, hold down guide assembly 22 can be moved to position 46 by application of a force to pivot around pivot point 42. Spring plungers 50 allow displacement of the hold down guide assembly 22 to allow a pivoting motion around bolt 42.

Figure 6:
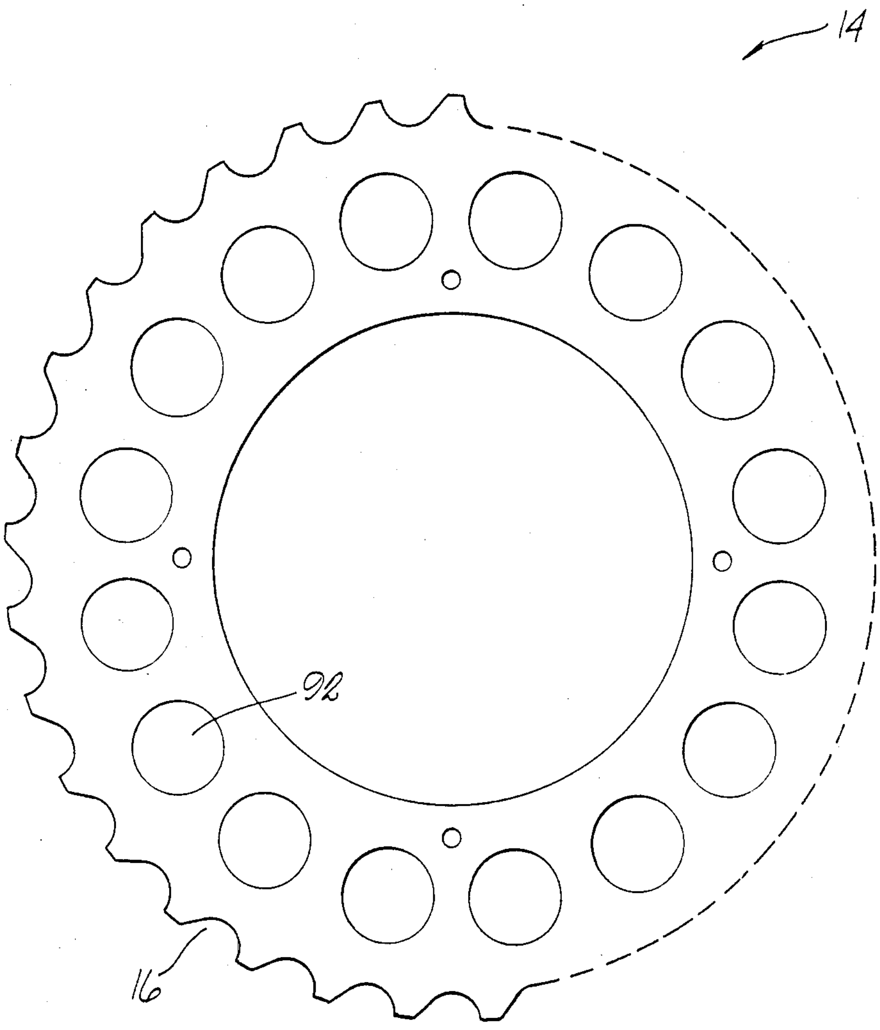
FIG. 6 is a schematic plan view of the star wheel of the present invention.

FIG. 6 is a schematic plan view of star wheel means 14. As illustrated in FIG. 6, star wheel means 14 has a plurality of star wheel pockets 16 disposed along its peripheral portions. Openings 92 eliminate mass of the star wheel means 14 so as to reduce inertial forces during operation. Each of the star wheel pockets 16 is configured to have a pocket profile, such as illustrated in FIG. 3, to prevent damage to cans during the process of transfer from star wheel means 14 to filler wheel pockets 20.

Figure 7:
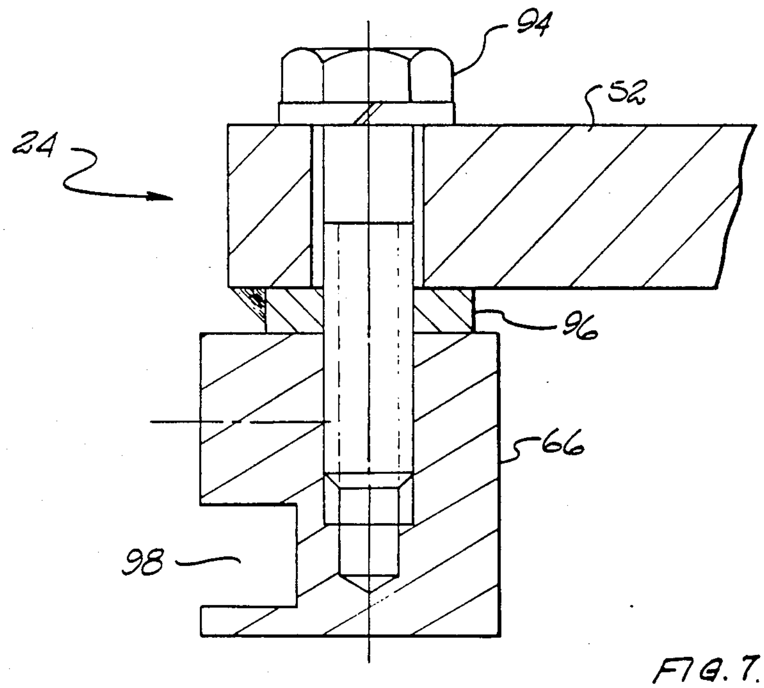
FIG. 7 is a schematic cross sectional view of the locator brush assembly.

FIG. 7 is a cross-sectional elevation view of locator brush assembly 24. Locator brush assembly 24 comprises a bracket 52 which is coupled to brush support 66 by way of screw connector 94. Spacer 96 provides the desired spacing for placement of brush 54 in a position between upper and lower arm portions 72, 74 of filler wheel pocket means 20, as illustrated in FIG. 4. Locator brush 54 is disposed in opening 98 of brush support 66.

Consequently, the present invention provides a can filling device which minimizes damage to cans during the filling process by providing a full control pocket on a rotating filler wheel capable of maintaining the axis of the cans to be filled in a constant vertical orientation. Locator brushes induce a force on cans 12 to fully locate the cans within the filler wheel pockets during the filling process. The star wheel functions to transfer the cans to the filler wheel pockets without damage due to play in the rotating filler wheel and star wheel by providing sufficient clearance in the tangential direction to accommodate displacement which may occur between star wheel 14 and rotating filler wheel 18. Additionally, a hold down guide assembly is provided to ensure that the cans are displaced in a fully downward direction against a can platform to prevent damage from the spindle during the process of locating the can for filling.

The foregoing description of the invention has been presented for purposes of illustration and description. It is not intended to be exhaustive or to limit the invention to the precise form disclosed and other modifications and variations may be possible in light of the above teaching. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternatives and embodiments of the invention except insofar as limited by the prior art.

What is claimed is:

1. A can filling device for minimizing damage to beverage cans during filling comprising:

rotating filler wheel means for supporting and transporting said cans in a substantially circular path in a substantially horizontal plane with the axis of said cans substantially parallel to a substantially vertical axis;

filler wheel pocket means disposed on said rotating filler wheel means for supporting said cans and having upper and lower arm portions with rigid sustantially semi-circularly shaped can pockets formed therein for holding said cans along substantially vertically displaced upper and lower portions of said cans which are spatially separated along said axis of said cans to prevent radially inward and tangential displacement of said axis of said cans from said substantially vertical axis;

star wheel means for supporting and transferring cans in said substantially horizontal plane from a can supply to said filler wheel pocket means;

star wheel pocket means disposed in said star wheel means and having a curved surface comprising adjoining arcs of a circle having substantially the same radius but spaced apart center points for transferring said cans to said filler wheel pocket means with sufficient clearance to prevent damage to the cans; and each of said arcs of a circle having a radius only very slightly larger than the radius of each can.

2. The device of claim 1 wherein:

said upper and lower pocket portions comprise a full control can pocket having a semicircular shape for precisely controlling the movement of said cans.

3. The device of claim 1 wherein:

said curved surface is continuous.

4. The device of claim 3 wherein:

said star wheel pocket means further comprise flat cut-away portions adjacent said continuous curved surface.

5. The device of claim 4 and further comprising:

hold-down guide means for contacting the tops of said cans and applying a force thereto in a downward direction to hold said cans in said substantially horizontal plane to prevent damage to said cans during transfer of said cans into said filler wheel pocket means.

6. The device of claim 5 and further comprising:

resilient means acting on said hold down means to apply said force.

7. A can filling device for minimizing damage to beverage cans during filling comprising:

rotating filler wheel means for transporting said cans in a substantially circular path in a substantially horizontal plane with the axis of said cans substantially parallel to a substantially vertical axis;

filler wheel pocket means disposed on said rotating filler wheel means and having upper and lower arm portions with rigid substantially semi-circularly shaped can pockets formed therein for holding said cans along substantially vertically displaced upper and lower portions of said cans which are spatially separated along said axis of said cans to prevent radially inward and tangential displacement of said axis of said cans from said substantially vertical axis;

star wheel means for transferring cans from a can supply to said filler wheel pocket means;

hold down guide means for contacting the tops of said cans and applying a force to said cans in a downward direction to hold said cans in said substantially horizontal plane to prevent damage to said cans during transfer of said cans into said filler wheel pocket means;

star wheel pocket means disposed in said star wheel means and having a curved surface comprising adjoining arcs of a circle having substantially the same radius but spaced apart center points for transferring said cans to said filler wheel pocket means with sufficient clearance to prevent damage to said cans; and each of said arcs of a circle having a radius only very slightly larger than the radius of each can.

8. The device of claim 7 and further comprising:

resilient means acting on said hold down means to apply said force.

* * * * *